United States Patent
Lienhardt et al.

(10) Patent No.: US 12,537,466 B2
(45) Date of Patent: Jan. 27, 2026

(54) ELECTRICAL SYSTEM FOR AN AIRCRAFT EQUIPPED WITH A MOTOR

(71) Applicant: SAFRAN, Paris (FR)

(72) Inventors: Anne Marie Lienhardt, Moissy-Cramayel (FR); Yann Fefermann, Moissy-Cramayel (FR); Florent Rougier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/847,733

(22) PCT Filed: Mar. 16, 2023

(86) PCT No.: PCT/FR2023/050370
§ 371 (c)(1),
(2) Date: Sep. 17, 2024

(87) PCT Pub. No.: WO2023/175278
PCT Pub. Date: Sep. 21, 2023

(65) Prior Publication Data
US 2025/0202390 A1    Jun. 19, 2025

(30) Foreign Application Priority Data
Mar. 18, 2022   (FR) ..................... 2202409

(51) Int. Cl.
*H02P 9/00* (2006.01)
*B64D 47/00* (2006.01)
(Continued)

(52) U.S. Cl.
CPC .............. *H02P 9/305* (2013.01); *B64D 47/00* (2013.01); *B64D 2221/00* (2013.01);
(Continued)

(58) Field of Classification Search
CPC .. H02P 9/305; H02P 2101/25; H02P 2101/30; H02P 2103/20; B64D 47/00; B64D 2221/00
See application file for complete search history.

(56) References Cited

U.S. PATENT DOCUMENTS

| 11,365,686 B2 | 6/2022 | Rougier et al. |
| 2014/0333127 A1* | 11/2014 | Edwards ................... H02J 4/00 307/9.1 |

FOREIGN PATENT DOCUMENTS

| EP | 2 801 719 A1 | 11/2014 |
| FR | 2 911 847 A1 | 8/2008 |
| WO | 2020/021214 A1 | 1/2020 |

* cited by examiner

*Primary Examiner* — Julio C. Gonzalez
(74) *Attorney, Agent, or Firm* — Sughrue Mion, PLLC

(57) ABSTRACT

An electrical system for an aircraft includes first and second buses, first and second electric generators, and first and second AC-to-DC converters. The first bus is connected to an AC network. The second bus is connected to a DC network of the aircraft. The first electric generator is connected to the first bus and a first rotary spool of an engine of the aircraft to exchange mechanical and/or electrical power. The first AC-to-DC converter is connected to the first and second buses. The second electric generator is connected to a second rotary spool of the engine of the aircraft. The second AC-to-DC converter connected to the second electric generator and to the second bus. One or more of the converters operates in a forced mode providing regulation of the electrical power of one or more buses, and/or a free mode providing regulation of a voltage of the second bus.

11 Claims, 7 Drawing Sheets

(51) Int. Cl.
  *H02P 9/30* (2006.01)
  *H02P 101/25* (2016.01)
  *H02P 101/30* (2015.01)
  *H02P 103/20* (2016.01)
(52) U.S. Cl.
  CPC ...... *H02P 2101/25* (2015.01); *H02P 2101/30* (2015.01); *H02P 2103/20* (2015.01)

ELECTRICAL SYSTEM FOR AN AIRCRAFT EQUIPPED WITH A MOTOR

CROSS REFERENCE TO RELATED APPLICATIONS

This application is a National Stage of International Application No. PCT/FR2023/050370 filed Mar. 16, 2023, claiming priority based on French Patent Application No. 2202409 filed Mar. 18, 2022, the contents of each of which being herein incorporated by reference in their entireties.

TECHNICAL FIELD

This application relates to the aeronautical sector. More precisely, this application relates to the electrical power supply of an aircraft equipped with an engine.

BACKGROUND

An aircraft may comprise electrical loads, such as a deicing system or a module for pressurizing a cabin of the aircraft, as well as an AC network and a DC network, which are in particular intended to supply these loads with electrical energy. The electrical power flowing through these networks is generally produced by rotary spools of the aircraft engine. In this case, the electricity production must be able to be distributed between the rotary spools. Under certain conditions, it must be these rotary spools that can receive an electrical power, typically to be started and/or assisted in flight. These limitations must not, however, increase the mass or reduce the efficiency of the engine.

SUMMARY

One aim is to improve the electrical system used to supply an aircraft with electrical power from the rotary spools of its engine.

For this effect provision is made, according to an aspect of this disclosure, for an electrical system for an aircraft comprising:
  a first bus intended to be connected to an AC network of an aircraft to allow the transfer of electrical power from the first bus to the AC network;
  a second bus intended to be connected to a DC network of the aircraft to allow the transfer of electrical power from the second bus to the DC network;
  a first electric generator connected to the first bus to inject electrical power into or draw electrical power off the first bus, the first electric generator being intended to be connected to a first rotary spool of an engine of the aircraft to allow an exchange of mechanical and/or electrical power between the first rotary spool and the first electric generator;
  a first AC-to-DC converter, the first converter being connected to the first bus to inject electrical power into or draw electrical power off the first bus and to the second bus to inject electrical power into or draw electrical power off the second bus;
  a second electric generator intended to be connected to a second rotary spool of the aircraft engine to allow an exchange of mechanical and/or electrical power between the second rotary spool and the second electric generator; and
  a second AC-to-DC converter, the second converter being connected to the second electric generator to allow an exchange of electric power between the second electric generator and the second converter, and to the second bus to inject electrical power into or draw electrical power off the second bus;

Advantageously, but optionally, the electrical system according to this disclosure may comprise at least one from among the features, taking alone or in combination:
  it further comprises:
  a third bus intended to be connected to the AC network to allow the transfer of electrical power from the third bus to the AC network;
  a third electric generator connected to the third bus to inject electrical power into or draw electrical power off the third bus, the third electric generator being intended to be connected to the first rotary spool to allow an exchange of mechanical and/or electric power between the first rotary spool and the third electric generator;
  a third AC-to-DC converter, the third converter being connected to the third bus to inject electrical power into or draw electrical power off the third bus and to the second bus to inject electrical power into or draw electrical power off the second bus;
  a fourth electric generator intended to be connected to the second rotary spool to allow an exchange of mechanical and/or electrical power between the second rotary spool and the fourth electric generator; and
  a fourth AC-to-DC converter, the fourth converter being connected to the fourth electric generator to allow an exchange of electrical power between the fourth electric generator and the fourth converter and to the second bus to inject electrical power into or draw electrical power off the second bus;
    the third electric generator is configured to provide the regulation of the voltage of the third bus;
    the first electric generator is configured to provide the regulation of the voltage of the first bus;
    at least one of the converters is configured to operate according to at least one of the following operating modes:
  a forced mode, in which the converter provides the regulation of the power of at least one bus to which it is connected;
  a free mode, in which the converter provides the regulation of the voltage of the second bus;
    it further comprises a controller configured to drive at least one of the converters so as to determine its operating mode; and
    the first electric generator is connected to the controller and configured to receive from the controller an order to provide the regulation of the power of the first bus.

According to another aspect of this disclosure, provision is made for an aircraft comprising:
  an engine comprising a first rotary spool and a second rotary spool;
  an AC network;
  a DC network; and
  an electrical system as previously described, in which the first bus is connected to the AC network, the second bus is connected to the DC network, the first electric generator and/or the third electric generator is connected to the first rotary spool, and the second electric generator and/or the fourth electric generator is connected to the second rotary spool.

Advantageously, but optionally, the aircraft according to this disclosure may comprise at least one from among the features, taken alone or in combination:
    the first rotary spool is a high-pressure spool and the second rotary spool is a low-pressure spool; and the first rotary spool is a low-pressure spool and the second rotary spool is a high-pressure spool.

According to another aspect of this disclosure, provision is made for a method of control of an electrical system as previously described, the method being implemented by the controller and comprising:

the driving of the second converter so that it operates in free mode to provide the regulation of the voltage of the second bus;

the receiving of a first measurement of an electrical power injected by the first electric generator into the first bus;

the receiving of a second measurement of an electrical power exchanged between the second electric generator and the second converter;

the comparison of a ratio of the first measurement to the second measurement with a reference value; and the driving of the first converter so that, if the ratio is different from the reference value, it operates in a forced mode in which it regulates the power of the first bus.

According to another aspect of this disclosure, provision is made for another method of control of an electrical system as previously described, the method being implemented by the controller and comprising:

the receiving of a measurement of an electrical power injected by the first electric generator into the first bus;

the comparison of the measurement with a reference value;

the driving of the first converter so that, if the measurement is different from the reference value, it operates in a forced mode in which it regulates the power of the first bus; and the driving of the second converter so that it operates in free mode to provide the regulation of the voltage of the second bus.

According to another aspect of this disclosure, provision is made for another method of control of an electrical system as previously described, the method being implemented by the controller and comprising:

the receiving of a measurement of an electrical power exchanged between the second electric generator and the second converter;

the comparison of the measurement with a reference value; and the driving of the second converter so that, if the measurement is different from the reference value, it operates in a forced mode in which it regulates the power of the second bus; and the driving of the first converter so that it operates in free mode to provide the regulation of the voltage of the second bus.

Advantageously, but optionally, one of the other methods of control according to this disclosure may further comprise a step of driving the first electric generator so that it regulates the voltage of the first bus.

According to another aspect of this disclosure, provision is made for yet another method of control of an electrical system as previously described, the method being implemented by the controller and comprising:

the receiving of a measurement of an electrical power injected by the first electric generator into the first bus;

the comparison of the measurement with a reference value;

the driving of the first electric generator so that, if the first measurement is different from the first reference value, it regulates the power of the first bus;

the driving of the first converter so that it operates in free mode to provide the regulation of the voltage of the first bus and of the second converter so that it operates in free mode to provide the regulation of the voltage of the second bus.

According to another aspect of this disclosure, provision is made for another method of control of an electrical system as previously described, the method being implemented by the controller and comprising:

the receiving of a measurement of an electrical power exchanged between the second electric generator and the second converter, the comparison of the measurement with a reference value;

the driving of the second converter so that, if the measurement is different from the reference value, it operates in a forced mode in which it regulates the power of the second bus;

the receiving of a measurement of an electrical power injected by the first electric generator into the first bus;

the comparison of the measurement with a reference value;

the driving of the first converter so that, if the measurement is different from the reference value, it operates in a forced mode in which it regulates the power of the first bus; and the driving of an electrical source connected to the second bus so that the electrical source regulates the voltage of the second bus.

According to another aspect of this disclosure, provision is made for a computer program comprising instructions which, when the program is executed by a computer of the controller, lead the latter to implement the method of control according to any of the modes of implementation previously described.

According to another aspect of this disclosure, provision is made for a computer-readable medium comprising instructions which, when they are executed by a computer of the controller, lead the latter to implement the method of control according to any of the modes of implementation previously described.

DESCRIPTION OF THE FIGURES

Other features, aims and advantages of this disclosure will become apparent from the following description, which is purely illustrative and non-limiting, and which must be read with reference to the appended drawings wherein.

On all the figures, similar items bear identical reference numbers.

DETAILED DESCRIPTION

Aircraft

Figure 1:
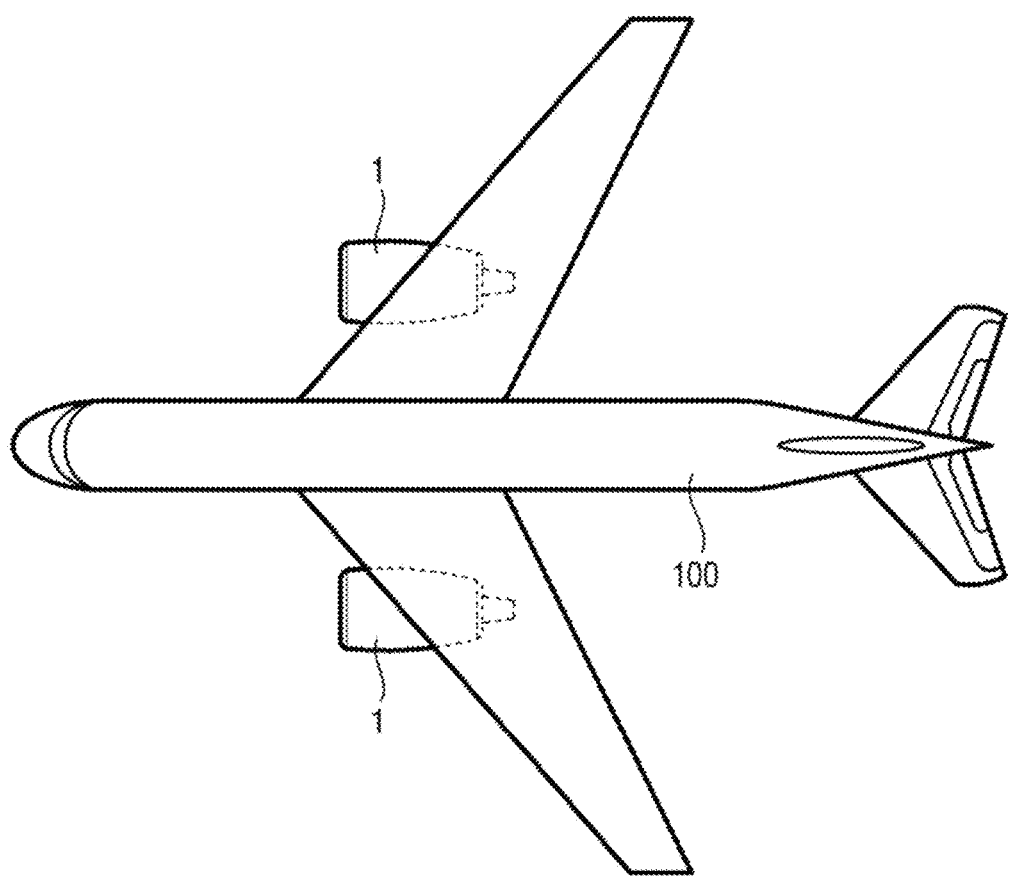
FIG. 1 schematically illustrates an aircraft.

FIG. 1 illustrates an aircraft 100 comprising at least one propulsion assembly 1, in this case two propulsion assemblies 1. The aircraft 100 shown is an airplane, civil or military, but which could be any other type of aircraft 100, such as a helicopter. The propulsion assemblies 1 are added on and attached to the airplane 100, each under one wing of the airplane 100, as can be seen on FIG. 1. This is however not limiting, since at least one propulsion assembly 1 can also be mounted on the wing of the airplane or else aft of its fuselage.

The aircraft 100 also comprises a plurality of electrical loads (or receivers) (not shown). Each electrical load is a device supplied with electrical energy and which can be configured to convert the electrical energy supplying it into another form of energy, such as for example heat or mechanical energy. Non-limiting examples of electrical loads of the aircraft 100 are: an electric motor, a heating and/or climate control system, a compressor, etc. These electrical loads in particular make it possible to fulfil a number of functionalities, in flight and also on the ground, such as pressurization and/or lighting of the cabin of the aircraft 100, operation of the cockpit, etc.

Figure 3:
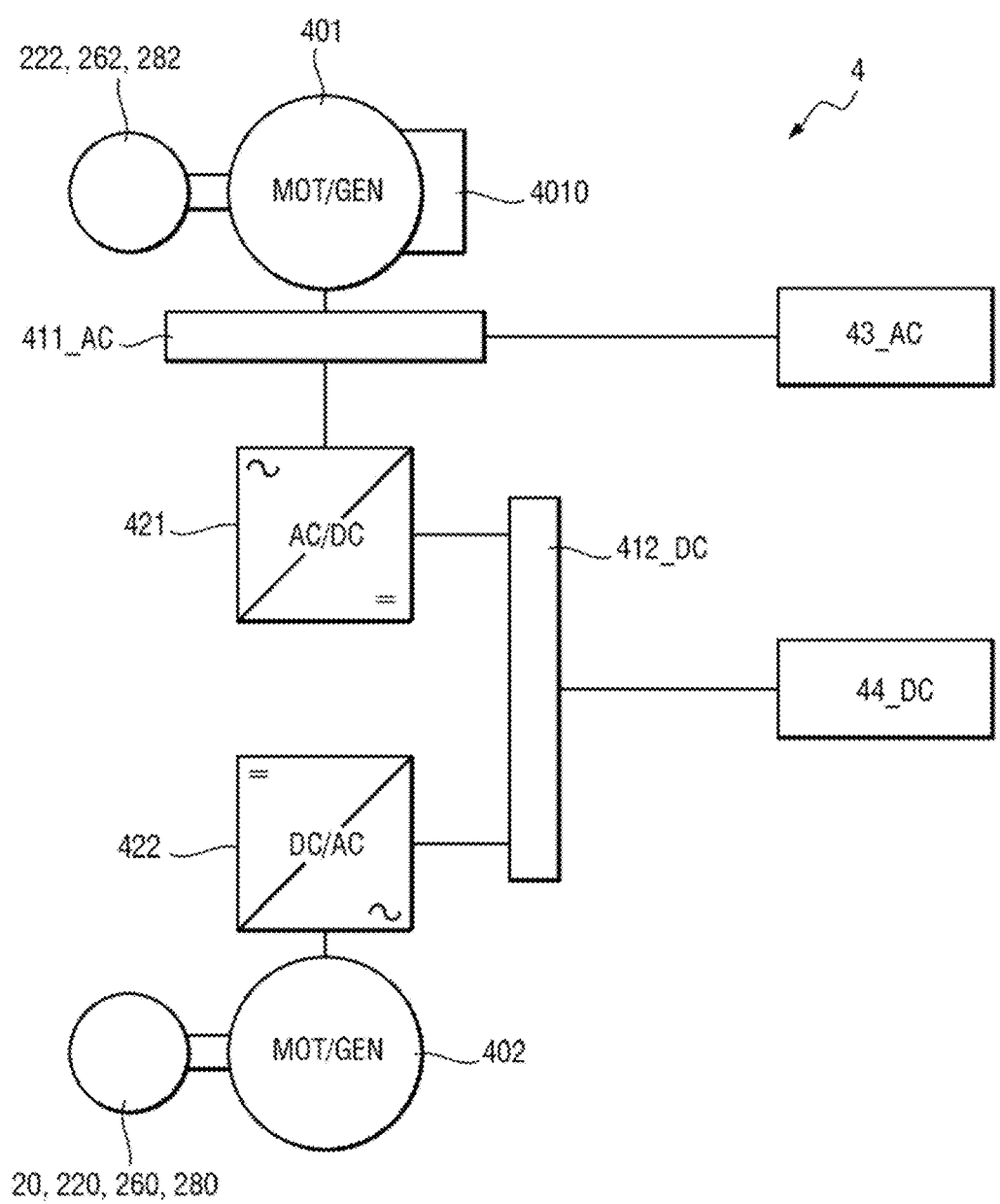
FIG. 3 schematically illustrates an electrical system according to an aspect of this disclosure.
Figure 4:
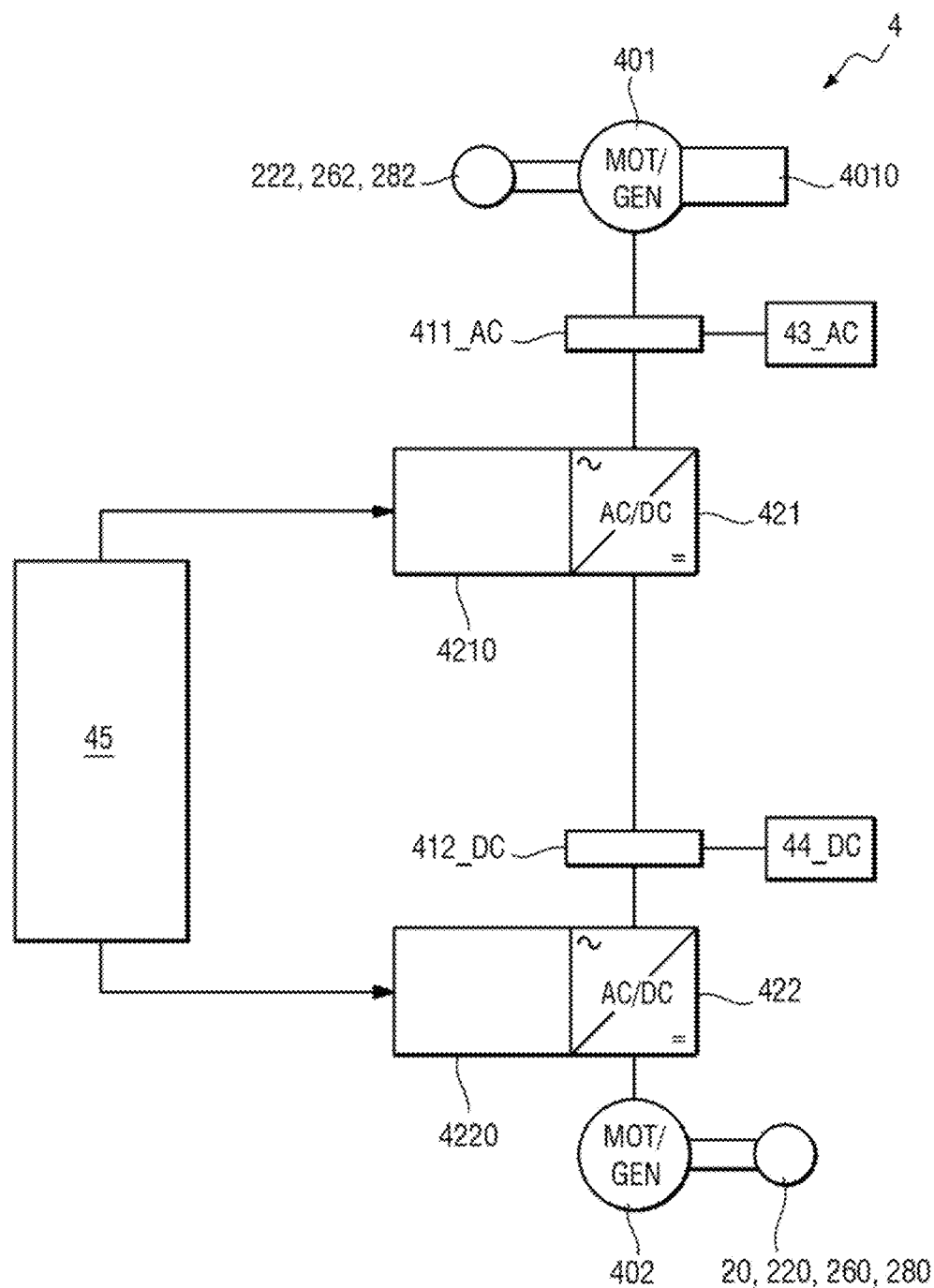
FIG. 4 is a more detailed illustration of FIG. 3.

To supply these electrical loads with electrical energy, the aircraft 100 comprises a plurality of electrical networks, including at least an AC network 43_AC and a DC network 44_DC, illustrated from FIG. 3 to FIG. 4. Each electrical network 43_AC, 44_DC typically comprises a set of electrical conductors, typically a set of wire(s) or bar(s) and/or an assembly of wire(s) and/or one (or more) printed circuit boards and/or any kind of apparatus that serves to conduct electricity. The AC network 43_AC only permits the flow of electrical energy in the form of an AC signal, whereas the DC network 44_DC only permits the flow of electrical energy in the form of a DC signal.

The electrical energy consumed by the electrical loads can, at least in part, be produced by the engine 2 of the propulsion assembly 1, and more specifically by means of rotary spools 20, 22, 26 of the engine 2.

Propulsion Assembly

Figure 2:
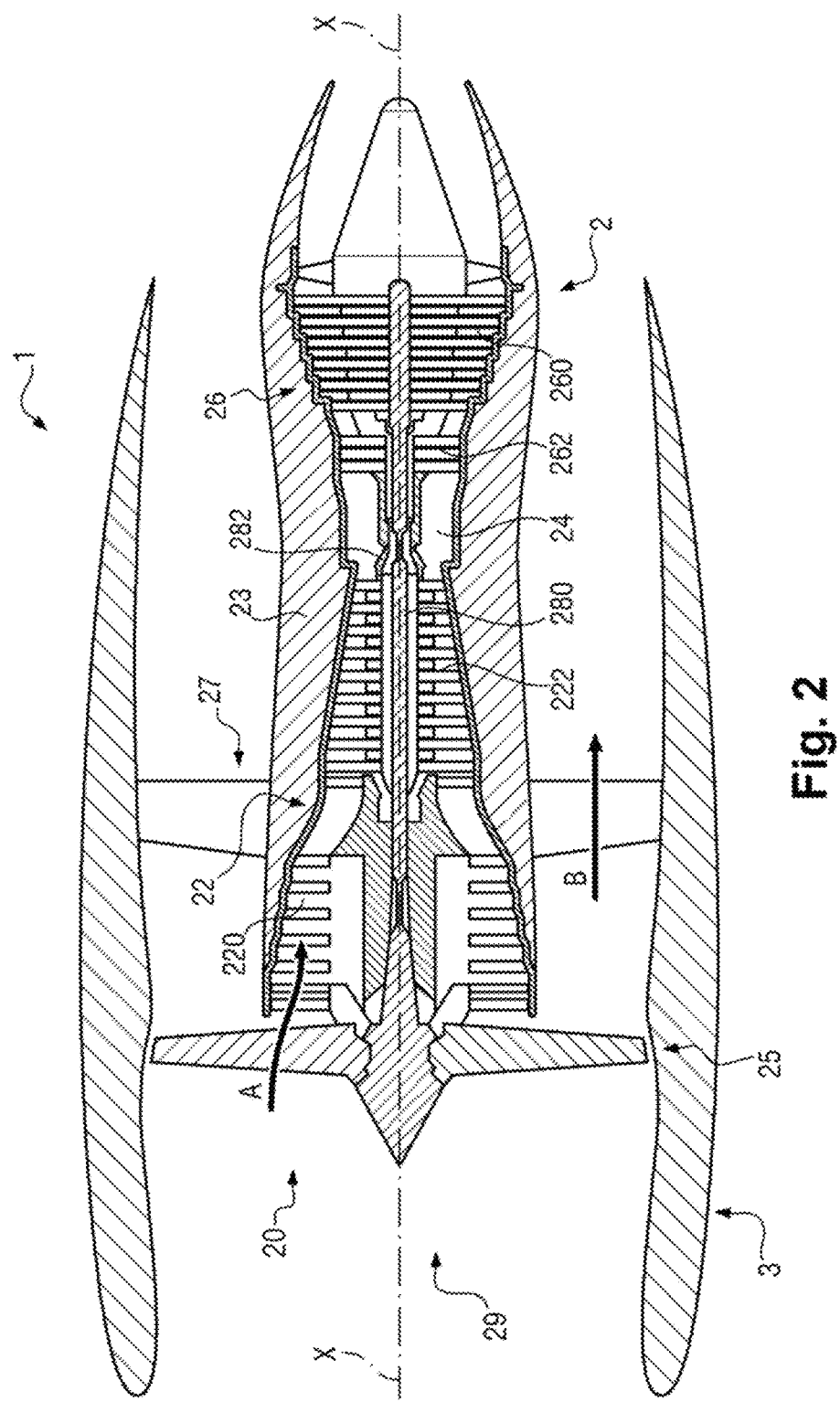
FIG. 2 is a schematic section view of a propulsion assembly for an aircraft.

FIG. 2 illustrates a propulsion assembly 1 having a longitudinal axis X-X, and comprising an engine 2 (or turbomachine) and a nacelle 3 surrounding the engine 2.

The propulsion assembly 1 is intended to be mounted on an aircraft 100, for example in the manner illustrated in FIG. 1. In this regard, the propulsion assembly 1 may comprise a pylon (not shown) intended to connect the propulsion assembly 1 to a part of the aircraft 100.

The engine 2 illustrated on FIG. 2 is a twin-spool, bypass, direct-drive turbojet engine. This is however non-limiting since the engine 2 may include a different number of spools and/or flow paths, and/or be another type of turbojet engine, such as a reduction gear turbojet engine or a turboprop engine.

Unless otherwise specified, the terms "upstream" and "downstream" are used with reference to the overall direction of the flow of air through the propulsion assembly 1 in operation. Similarly, an axial direction corresponds to the direction of the longitudinal axis X-X and a radial direction is a direction perpendicular to the longitudinal axis X-X and intersecting the longitudinal axis X-X. Moreover, an axial plane is a plane containing the longitudinal axis X-X and a radial plane is a plane perpendicular to the longitudinal axis X-X. A "circumference" is understood to mean a circle belonging to a radial plane and the center of which is on the longitudinal axis X-X. A tangential or circumferential direction is a direction tangent to a circumference: it is perpendicular to the longitudinal axis X-X but does not pass through the longitudinal axis X-X. Finally, the adjectives "inner" (or "internal") and "outer" (or "external") are used with reference to a radial direction so that the inner part of an element is, along a radial direction, closer to the longitudinal axis X-X than the outer part of the same element.

As can be seen on FIG. 2, the engine 2 comprises, from upstream to downstream, a fan 20, a compression section 22 comprising a low-pressure compressor 220 and a high-pressure compressor 222, a combustion chamber 24 and an expansion section 26 comprising a high-pressure turbine 262 and a low-pressure turbine 260. The fan 20, the rotor part of the low-pressure compressor 220, and the rotor part of the low-pressure turbine 260 are connected to one another by a low-pressure shaft 280 extending along the longitudinal axis X-X, the fan 20, the low-pressure compressor 220 and the low-pressure turbine 260 then forming a low-pressure spool 20, 220, 260 (LP spool), 280, which is a first rotary spool. The rotor part of the high-pressure compressor 222 and the rotor part of the high-pressure turbine 262 are connected to one another by a high-pressure shaft 282 extending along the longitudinal axis X-X, the high-pressure compressor 222 and the high-pressure turbine 262 then forming a high-pressure spool 222, 262, 282 (HP spool), which is a second rotary spool. As can be seen on FIG. 2, the compression section 22, the combustion chamber 24 and the expansion section 26 are surrounded by an engine casing 23, while the fan 20 is surrounded by a fan casing 25. The engine casing 23 and the fan casing 25 are connected to one another by profiled structural arms 27 forming OGVs (Outlet Guide Vanes) circumferentially distributed all around the longitudinal axis X-X. The longitudinal axis X-X forms an axis of rotation for the fan 20, the rotor part of the compression section 22 and the rotor part of the expansion section 26, in other words for the first rotary spool and the second rotary spool, which are able to be rotationally driven around the longitudinal axis X-X with respect to the engine casing 23 and to the fan casing 25.

The nacelle 3 extends radially outside the engine 2, all around the longitudinal axis X-X, so as to surround both the fan casing 25 and the engine casing 23, and to define, with a downstream part of the engine casing 23, a downstream part of a secondary air path B, the upstream part of the secondary air path B being defined by the fan casing 25 and an upstream part of the engine casing 23. The upstream part of the nacelle 3 further defines an air inlet 29 through which the fan 20 suctions the stream of air flowing through the propulsion assembly 1. The nacelle 3 is secured to the fan casing 25 and added on and attached to the aircraft 100 by means of the pylon.

The engine 2 may also comprise an AGB (Accessory GearBox) (not shown), typically housed in a cavity fashioned in the nacelle 3. The accessory gearbox comprises a set of gears used to rotationally drive a plurality of shafts around their own axis, accessories being mounted on these shafts to draw useful mechanical power from their rotation. The gear assembly is itself driven using a power shaft connecting, optionally by way of a transfer case (not shown), the accessory gearbox to at least one from among the high-pressure spool 222, 262, 282 and the low-pressure spool 20, 220, 260, 280, typically meshed with at least one from among the high-pressure shaft 282 and the low-pressure shaft 280. In this regard, the power shaft can extend inside a longitudinal cavity fashioned in one of the structural arms 27. In this way, mechanical power can be drawn off at least one from among the high-pressure spool 222, 262, 282 and the low-pressure spool 20, 220, 260, 280 to be delivered to at least one of the accessories by way of the accessory gearbox.

The engine 2 can itself also comprise a plurality of electrical loads (not shown), such as a starter or a battery, which must also be supplied with electrical power, some in the form of an AC signal, others in the form of a DC signal.

In operation, the fan 20 suctions a stream of air, a portion of which, flowing in a primary air path A, is successively compressed in the compression section 22, ignited in the combustion chamber 24 and expanded in the expansion section 26 before being expelled from the engine 2. The air path A traverses the engine casing 23 from side to side. Another portion of the stream of air flows in the secondary air path B which has an elongate annular shape surrounding the engine casing 23, the air suctioned by the fan 20 being guided by the OGVs then expelled from the propulsion assembly 1. In this way, the propulsion assembly 1 generates a thrust. This thrust can, for example, be turned to advantage by the aircraft 100 to which the propulsion assembly 1 is added and attached.

Electrical System

FIG. 3 illustrates an electrical system 4 distributed between the propulsion assembly 1 and the aircraft 100 for supplying electrical energy to the electrical loads of the engine 2 and/or the aircraft 100, typically by means of the AC network 43_AC and the DC network 44_DC.

The electrical system 4 comprises a first bus 411_AC connected to the AC network 43_AC to allow the transfer of an electric power from the first bus 411_AC to the AC network 43_AC. The first bus 411_AC is therefore configured to permit the flow of electrical energy in the form of an AC signal. The electrical system 4 further comprises a second bus 412_DC connected to the DC network 44_DC to allow the transfer of electrical power from the second bus 412_DC to the DC network 44_DC. The second bus 412_DC is therefore configured to permit a flow of electrical energy in the form of a DC signal. Each one of the first bus 411_AC and the second bus 412_DC typically comprises a set of electrical conductors, typically a set of wire(s) or bar(s) and/or an assembly of wire(s) and/or one (or more) printed circuit boards and/or any apparatus that serves to conduct electricity. The electrical loads of the engine 2 can also be connected to at least one out of the first bus 411_AC and the second bus 412_DC to take from it the electrical energy needed for their operation.

The electrical system 4 further comprises a first electric generator 401 connected to the first bus 411_AC to inject an electrical power into or draw an electrical power off the first bus 411_AC. The first electric generator 401 is, moreover, connected to a rotary spool 20, 22, 26 of the engine 2 to allow an exchange of mechanical and/or electrical power between the rotary spool 20, 22, 26 and the first electric generator 401. In addition, the electrical system 4 comprises a second electric generator 402 connected to another rotary spool 20, 22, 26 of the engine 2 to allow an exchange of mechanical and/or electrical power between the other rotary spool 20, 22, 26 and the second electric generator 402.

Each of the first electric generator 401 and the second electric generator 402 can typically be a wound-rotor synchronous machine, typically comprising three stages, known as a VFG (Variable Frequency Generator), driven by at least one from among the high-pressure shaft 282 and the low-pressure shaft 280 of the engine 2, typically by way of the accessory gearbox. Such a machine in particular has the advantage of being able to be driven to regulate the voltage of the bus to which it is connected. Typically, when the first electric generator 401 is a machine of VFG type, the first electric generator 401 can then drive the voltage of the first bus 411_AC at a predetermined voltage, typically 115 Vac or 230 Vac, according, in particular, to the quality limitations of the AC network 43_AC. This is however non-limiting since other types of machine may be envisioned, such as permanent magnet synchronous machines, known as PMSM (Permanent-Magnet Synchronous Machine Drives) which in particular have the advantage of having a smaller mass, or such as asynchronous machines (or Induction machines) or with variable-reluctance machines. Preferably, the first electric generator 401 is a synchronous machine of VFG type, while the second electric generator 402 is a permanent magnet synchronous machine of PMSM type.

Each of the first electric generator 401 and the second electric generator 402 is therefore connected to a distinct rotary spool 20, 22, 26 of the engine 2. Thus, in a variant shown from FIG. 3 to FIG. 5, the first electric generator 401 is connected to the high-pressure spool 222, 262, 282 and the second electric generator 402 is connected to the low-pressure spool 20, 220, 260, 280. In another variant (not shown), the first electric generator is connected to the low-pressure spool and the second electric generator is connected to the high-pressure spool. Each of the first electric generator 401 and the second electric generator 402 can therefore operate as an electric motor, when it draws electrical power off the first bus 411_AC and/or off the second bus 412_DC to transmit mechanical power to the rotary spool 20, 22, 26 to which it is connected. Furthermore, each of the first electric generator 401 and the second electric generator 402 can operate as an electric generator, when it injects electrical power into the first bus 411_AC and/or into the second bus 412_DC which it has converted from mechanical power extracted from the rotary spool 20, 22, 26 to which it is connected.

As can be seen on FIG. 3, the first electric generator 401 may comprise a command device 4010 configured to control the AC voltage generated by the first electric generator 401 on the first bus 411_AC.

FIG. 3 also illustrates the fact that the electrical system 4 comprises a first AC-to-DC converter 421, which is connected both to the first bus 411_AC, to inject electrical power into or draw electrical power off the first bus 411_AC, and to the second bus 412_DC, to inject electrical power into or draw electrical power off the second bus 412_DC. The first converter 421 is reversible and allows a part of the electrical power generated by the first electric generator 401 to be transferred from the first bus 411_AC to the second bus 412_DC. The first converter 421 also makes it possible to transfer electrical power from the second bus 412_DC to the first bus 411_AC to supply electrical power to the first electric generator 401. The first electric generator 401 can thus convert this electrical power received from the second bus 412_DC into mechanical power for the benefit of the rotary spool 20, 22, 26 to which it is connected. As will be described in more detail hereinafter, this can typically be done on starting the engine 2 or during a phase of assistance of the engine 2.

FIG. 3 finally illustrates the fact that the electrical system 4 comprises a second AC converter 422 which is connected both to the second electric generator 402 to allow an exchange of electrical power between the second electric generator 402 and the second converter 422, and to the second bus 412_DC to inject electrical power into or draw electrical power off the second bus 412_DC. By controlling the second converter 422, it is therefore possible to inject or draw off a mechanical power at the rotary spool 20, 22, 26 to which the second electric generator 402 is connected.

Each of the first converter 421 and the second converter 422 can take the form of an inverter or an OGV, commanded or otherwise.

FIG. 4 illustrates the electrical system 4 in more detail.

As can be seen on FIG. 4, each of the first converter 421 and the second converter 422 comprises a control device 4210, 4220, while the electrical system 4 comprises a controller 45 configured to drive each of the first converter 421 and of the second converter 422, preferably by way of their control device 4210, 4220. In practice, the controller 45 can be a controller 45 of the engine 2, which drives the control device 4210, 4220 by means of control references (current, power, torque etc.). The controller 45 comprises a processor (not shown) configured to implement at least one aspect of at least one of the variants of the control method E, E', E'', E''' of the electrical system 4 described in more detail from FIG. 6 to FIG. 9. The processor of the controller 45 is suitable for reading a computer-readable medium comprising instructions which, when they are executed by a computer such as the processor of the controller 45, lead it to implement the control method E, E', E'', E'''. The computer-readable medium and/or the controller 45 are configured to load, typically into a memory, a computer program comprising instructions which, when the program is executed by a computer such as the processor of the controller 45, lead it to implement the control method E, E', E'', E'''. In this respect, the controller 45 may comprise a memory (not shown).

In operation, it is necessary to provide various regulations of the electrical system 4.

The regulation of the power of the first bus 411_AC and/or of the second bus 412_DC makes it possible to ensure that the electrical power transmitted to the first bus 411_AC and/or to the second bus 412_DC by the first electric generator 401 and/or the second electric generator 402 is sufficient to meet the requirements of the electrical loads of the aircraft 100 and/or of the engine 2 on the AC network 43_AC and/or on the DC network 44_DC.

In a first variant, as will be described in more detail hereinafter with reference to FIG. 6, to FIG. 7 and to FIG. 8, during the operation of the electrical system 4, the regulation of the power of the first bus 411_AC and/or of the second bus 412_DC is implemented by at least one from among the first converter 421 and the second converter 422.

In a second variant, also described in more detail hereinafter with reference to FIG. 9, the first electric generator 401 can be configured to receive an order from the controller 45, which allows it to regulate the power of the first bus 411_AC.

The regulation of the voltage of the first bus 411_AC and/or of the second bus 412_DC is critical. Specifically, the variation over time of the electrical voltage within the first bus 411_AC and/or the second bus 412_DC, during the operation of the electrical system 4, must remain within the bounds of an envelope even if, of course, it can intermittently vary about a given nominal value. Specifically, for all of the elements that are connected to the first bus 411_AC and/or to the second bus 412_DC to operate correctly, the electrical voltage must not take any values exceeding the bounds of the envelope. The envelope in fact defines the upper and lower excursion limits of the electrical system 4. The envelope may comprise limits defined for normal and/or abnormal operating conditions, which limits surround, symmetrically or otherwise, a nominal level of electrical voltage of the first bus 411_AC and/or of the second bus 412_DC.

In a diagram (not shown) giving the variation in the electrical voltage as a function of time, a limit of an envelope is typically shown as a line, broken or otherwise. Preferably, even if the limit does not at first define an electrical voltage value that is constant, generally associated with the characteristic time of turning on (or starting) the electrical system 4, it is known for the limit to then define an electrical voltage value that is constant, and to do so in order to guarantee the stability of operation of the first bus 411_AC and/or of the second bus 412_DC and, hence, of the electrical system 4. Such an envelope can, for example, be defined in a standard relating to the quality of the electrical system 4 and/or of the AC network 43_AC and/or of the DC network 44_DC, but can also be defined by a specifications book of an apparatus to which the electrical system 4 is connected, typically the requirements of the manufacturer of the aircraft 100 into which the electrical system 4 is integrated.

In this respect, and as will be described in detail hereinafter, during the operation of the system 4 according to the first variant, the regulation of the voltage of the first bus 411_AC is advantageously implemented by the first electric generator 401, particularly when it is a synchronous machine of VFG type. Furthermore, the regulation of the voltage of the second bus 412_DC is advantageously implemented by at least one from among the first converter 421 and the second converter 422, except during start-up of the engine 2, when this regulation of voltage cannot be provided by the converters 421, 422 and when, as will be described in more detail hereinafter, it is necessary that another electrical source be connected to the second bus 412_AC to provide the regulation of the voltage thereof.

As will be described in more detail hereinafter, in the second variant in which it is the first electric generator 401 that provides the regulation of the power of the first bus 411_AC, it is the first converter 421 that provides the regulation of the voltage of the first bus 411_AC and the second converter 422 that provides the regulation of the voltage of the second bus 412_AC.

Thus, each one out of the first converter 421 and the second converter 422 is configured to operate in different operating modes.

In a forced mode, the converter 421, 422 injects or draws an electrical power, which is set by the controller 45, into/off the first bus 411_AC and/or the second bus 412_DC, as a function of certain operating parameters of the engine 2, as will be described in more detail hereinafter. In other words, in the forced mode, the converter 421, 422 provides the regulation of the power of the bus (or buses) 411_AC, 412_DC to which it is connected.

In the first variant, in a free mode, the converter 421, 422 injects an electrical power into or draws an electrical power off the first bus 411_AC and/or the second bus 412_DC which depends on the electrical power transferred to the AC network 43_AC and/or to the DC network 44_DC, and on the voltage of the first bus 411_AC and/or of the second bus 412_DC. More precisely, in the first variant, the converter 421, 422 provides, in the free mode, the regulation of the voltage of at least the second bus 412_DC.

In the second variant in which it is the first electric generator 401 that provides the regulation of the power of the first bus 411_AC, the converters 421, 422 are, in the free mode, configured to regulate the voltage of the first bus 411_AC and the second bus 412_DC.

In a wait mode, the converter 421, 422 is not operational, and neither transfers nor draws any power to or from the first bus 411_AC and/or the second bus 412_DC.

The controller 45 is therefore configured to drive the first converter 421 and/or the second converter 422 so as to determine its operating mode, but also the associated order (power generation or assistance, as described in detail hereinafter). Typically, the controller 45 can receive a measurement of the power exchanged between the first electric generator 401 and the rotary spool 20, 22, 26 to which it is connected, which can typically be supplied by the command device 4010 of the first electric generator 401, and a measurement of the power exchanged between the second electric generator 402 and the rotary spool 20, 22, 26 to which it is connected, which can typically be supplied by the control device 4220 of the second converter 422. From these measurements, the controller 45 can compute the control references to be transmitted to the control devices 4210, 4220 of the converters 421, 422 determining a forced mode and the set level of electrical power that they must draw off and/or inject into the first bus 411_AC and/or the second bus 412_DC.

Figure 5:
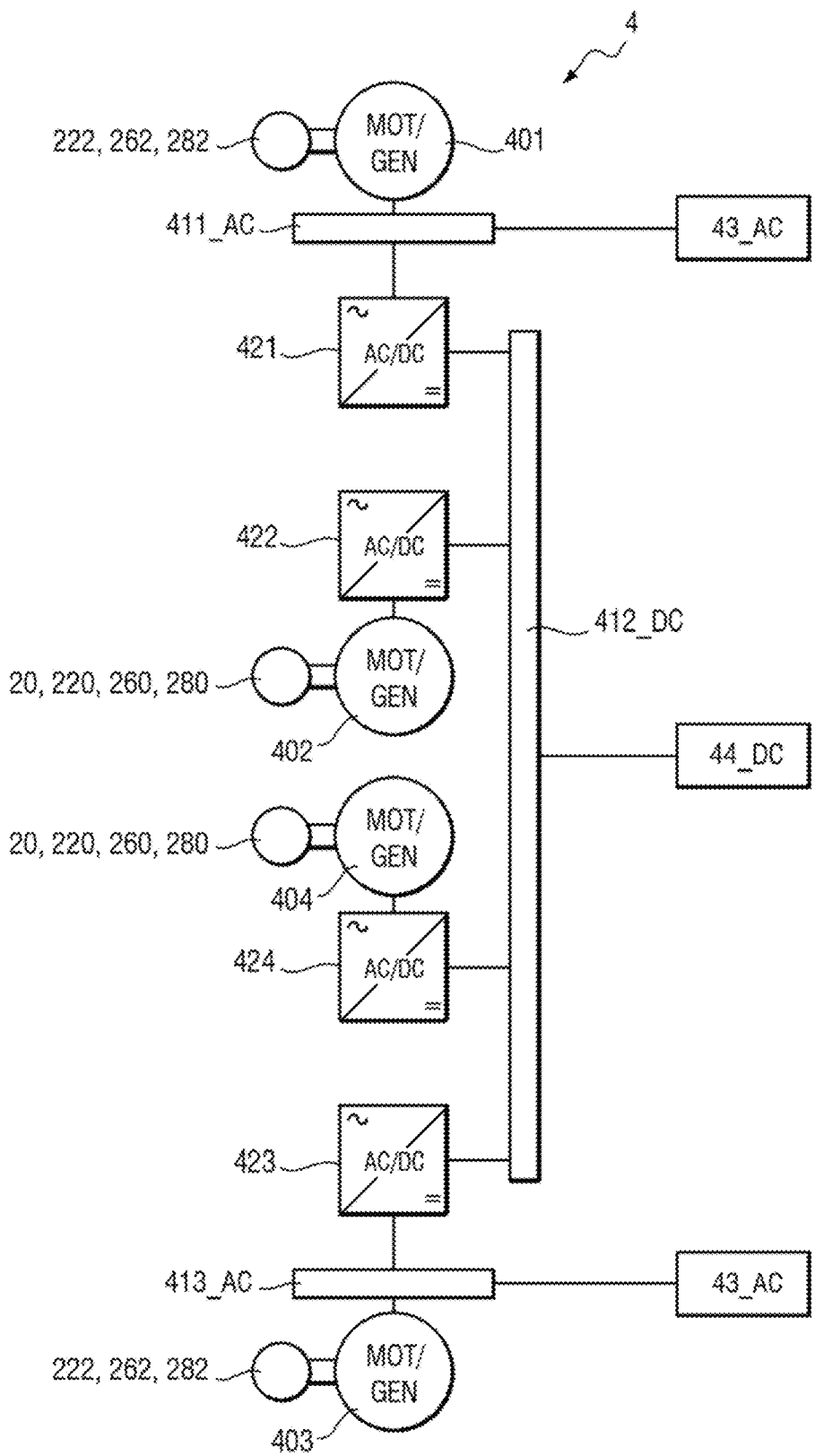
FIG. 5 schematically illustrates an electrical system according to another aspect of this disclosure.

FIG. 5 illustrates an electrical system 4 according to another embodiment, similar to the embodiment illustrated on FIG. 3 and on FIG. 4.

As can be seen on FIG. 5, in this embodiment, the electrical system 4 further comprises a third bus 413_AC connected to the AC network 43_AC to allow the transfer of electrical power from the third bus 413_AC to the AC network 43_AC. The third bus 413_AC advantageously has an identical structure and operation to the first bus 411_AC.

Moreover, the electrical system 4 also comprises a third electric generator 403 connected to the third bus 413_AC to inject electrical power into or draw electrical power off the third bus 413_AC, the third electric generator 403 being connected to the same rotary spool 20, 22, 26 as the first electric generator 401, to allow an exchange of mechanical and/or electrical power between this rotary spool and the third electric generator 403. The third electric generator 403 preferably has an identical structure and operation to the first electric generator 401. In particular, in the first variant, the regulation of the voltage of the third bus 413_AC is advantageously implemented by the third electric generator 403, typically when it is a synchronous machine of VFG type. In the second variant, the third electric generator 403 can be configured to receive an order from the controller 45, which allows it to regulate the power of the third bus 413_AC.

In addition, the electrical system 4 comprises a third AC-to-DC converter 423, the third converter 423 being, on the one hand, connected to the third bus 413_AC, to inject electrical power into or draw electrical power off the third bus 413_AC and, on the other hand, to the second bus 412_DC, to inject electrical power into or draw electrical power off the second bus 412_DC. The third converter 423 advantageously has an identical structure and operation to the first converter 421. Just like the first converter 421, the third converter 423 may comprise a command device (not shown) configured to control the AC voltage generated by the third electric generator 403 on the third bus 413_AC.

Furthermore, as can be seen on FIG. 5, the electrical system 4 comprises a fourth electric generator 404 connected to the same rotary spool 20, 22, 26 as the second electric generator 402, to allow an exchange of mechanical and/or electrical power between this rotary spool and the fourth electric generator 404. The fourth electric generator 404 preferably has an identical structure and operation to the second electric generator 402.

Finally, the electrical system 4 comprises a fourth AC-to-DC converter 424, the fourth converter 424 being, on the one hand, connected to the fourth electric generator 404, to allow an exchange of electrical power between the fourth electric generator 404 and the fourth converter 424 and, on the other hand, to the second bus 412_DC, to inject electrical power into or draw electrical power off the second bus 412_DC. The fourth converter 424 preferably has an identical structure and operation to the second converter 422.

Each of the third converter 423 and the fourth converter 424 may also comprise a control device (not shown), and operate in the operating modes described for the first converter 421 and the second converter 422, particularly, in forced mode, for the regulation of the power of the third bus 413_AC and/or of the second bus 412_DC by injection and/or draw of a set electrical power into/off the third bus 413_AC and/or the second bus 412_DC, or, in free mode, for the regulation of the voltage of the second bus 412_DC, and, in the second variant in which it is the first electric generator 401 that provides the regulation of the power of the first bus 411_AC and/or it is the third electric generator 403 that provides the regulation of the power of the third bus 413_AC, for the regulation of the voltage of the third bus 413_AC. Where applicable, the controller 45 is configured to drive one out of the third converter 423 and the fourth converter 424 so as to determine its operating mode.

Owing to the electrical system 4 according to one of the described embodiments, a power transfer is made possible between the rotary spools 20, 22, 26, particularly by way of the first bus 411_AC and/or the second bus 412_DC and/or the third bus 413_AC.

It should moreover be noted that, when the aircraft 100 is equipped with two engines 2, this aircraft 100 may comprise one electrical system 4 per engine 2. Where applicable, each electrical system 4 can be connected to an AC network 43_AC and/or a DC network 44_DC which is distinct, or otherwise, from the other electrical system 4. This advantageously makes it possible to benefit from redundancy between the electrical systems of each of the engines 2.

Control Method

Figure 6:
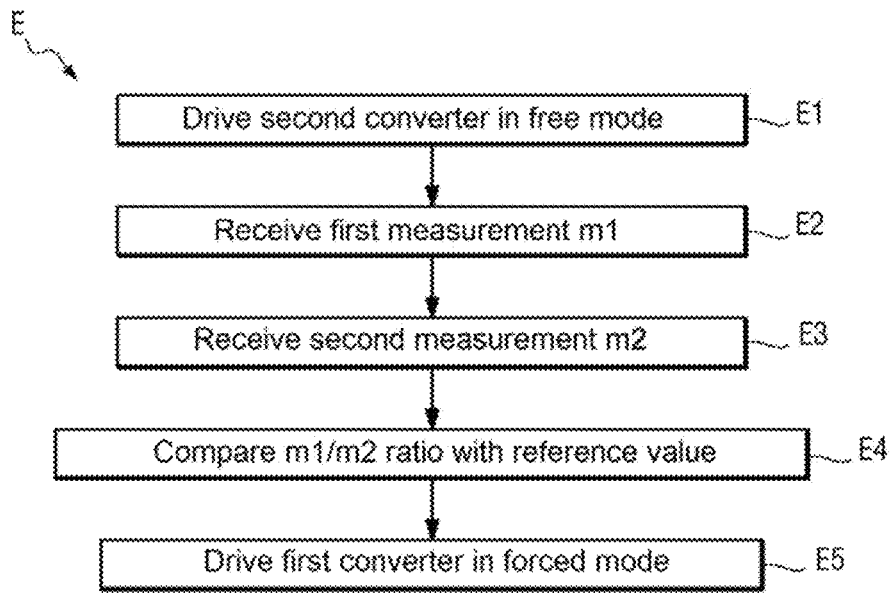
FIG. 6 is a flow chart illustrating an aspect of a first variant of a method of control according to this disclosure.
Figure 7:
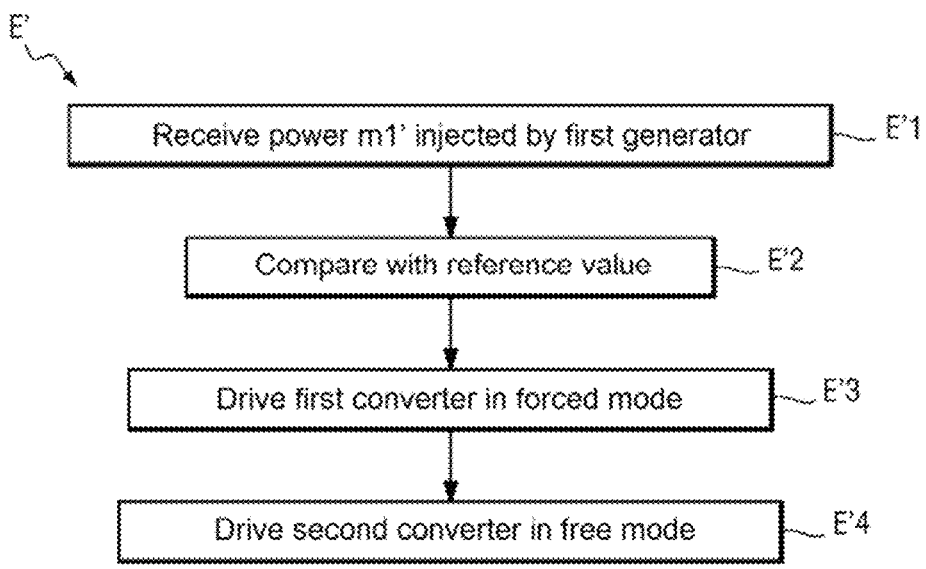
FIG. 7 is a flow chart illustrating another aspect of the first variant of a method of control according to this disclosure.
Figure 8:
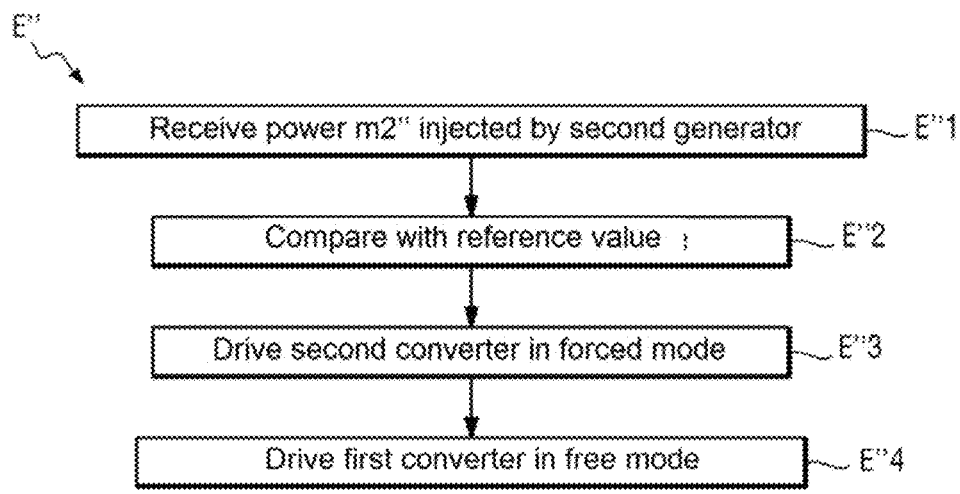
FIG. 8 is a flow chart illustrating another aspect of the first variant of a method of control according to this disclosure.

FIG. 6 to FIG. 8 show different aspects of the first variant of a method E, E', E" of control of an electrical system 4 according to at least one of the described embodiments. Each time, the control method E, E', E" is implemented by the controller 45, where applicable assisted by the command device 4010 and/or the control devices 4210, 4220. These different aspects correspond to different situations, during the operation of the aircraft 100, on the ground as in flight, in which the electrical system 4 is used to provide the exchanges of power between the engine 2 and the aircraft 100.

With reference to FIG. 6, the electrical system 4 is used to power the electrical loads of the aircraft 100 and/or of the engine 2, while observing a distribution of the generated electrical power from the high and low-pressure spools 20, 22, 26 of the engine 2 that the controller imposes on it 45. More precisely, the second converter 422 is driven E1 so as to operate in a free mode, thus ensuring the regulation of the voltage of the second bus 412_DC. Furthermore, a first measurement m1 of an electrical power injected by the first electric generator 401 into the first bus 411_AC and a second measurement m2 of an electrical power exchanged between the second electric generator 402 and the second converter 422 are received E2, E3 then, a ratio m1/m2 of the first measurement to the second measurement is compared E4 to a reference value, typically the value imposed by the controller 45 for the distribution of power to be drawn off each of the high and low-pressure spools 20, 22, 26. Finally, if the ratio is different from the reference value, the first converter 421 is driven E5 so as to operate in a forced mode of regulation of the power of the first bus 411_AC into which it injects/draws a set electrical power into/off the first bus 411_AC. In other words, the controller 45 is constantly adapting the control reference of the first converter 421 so as to observe a predetermined distribution of the electrical power generated by the first electric generator 401 and the second electric generator 402. Advantageously, the voltage of the first bus 411_AC is itself regulated by the first electric generator 401, particularly when this latter is a synchronous machine of VFG type.

With reference to FIG. 7, the electrical system 4 is used to assist the rotary spool 20, 22, 26 (preferably the HP spool) connected to the first electric generator 401. More specifically, to assist the rotary spool 20, 22, 26 connected to the first electric generator 401, a measurement m1' of an electrical power injected by the first electric generator 401 into the first bus 411_AC is received E'1 and compared E'2 with a reference value, which is typically the power required to assist the rotary spool 20, 22, 26 to which the first electric generator 401 is connected. If the measurement m1' is different from the reference value, the first converter 421 is driven E'3 so as to operate in a forced mode in which it regulates the power of the first bus 411_AC, i.e. it injects/draws a set power into/off the first bus 411_AC. Moreover, the second converter 422 is then driven E'4 so as to operate in a free mode, thus providing the regulation of the voltage of the second bus 412_DC. Advantageously, the voltage of the first bus 411_AC is itself regulated by the first electric generator 401, particularly when this latter is a synchronous machine of VFG type.

With reference to FIG. 8, the electrical system 4 is used to assist the rotary spool 20, 22, 26 (preferably the LP spool) connected to the second electric generator 402. More specifically, a measurement m2" of an electrical power exchanged between the second electric generator 402 and the second converter 422 is received E"1 and compared E"2 with a reference value, which is typically the power required to assist the rotary spool 20, 22, 26 to which the second electric generator 402 is connected. If the measurement m2" is different from the reference value, the second converter 422 is driven E"3 so as to operate in a forced mode in which it regulates the power of the second bus 412_DC, i.e. it injects/draws a set power into/off the second bus 412_DC. Moreover, the first converter 421 is driven E"4 so as to operate in a free mode, so that it provides the regulation of the voltage of the second bus 412_DC. Advantageously, the voltage of the first bus 411_AC is itself regulated by the first electric generator 401, particularly when this latter is a synchronous machine of VFG type.

In other words, the controller 45 constantly adapts the control reference of the first converter 421 and/or of the second converter 422 so as to assist the rotary spools 20, 22, 26 by means of the first electric generator 401 and/or the second electric generator 402, while providing the regulation of the voltage of the second bus 412_DC, the regulation of the voltage of the first bus 411_AC being itself advantageously provided by the first electric generator 401, particularly when this latter is a synchronous machine of VFG type.

Of course, it is possible to assist both the rotary spool 20, 22, 26 connected to the first electric generator 401 and the rotary spool 20, 22, 26 connected to the second electric generator 402, for example during the starting of the engine 2. To do this, the illustrated steps of FIG. 7 to FIG. 8 are conducted in parallel, each of the first converter 421 and the second converter 422 being in forced mode. In this case, it is necessary for another electrical source (not shown) connected to the second bus 412_DC to provide the regulation of the voltage of the second bus 412_DC. Furthermore, when it is necessary to only start one or the other of the rotary spools 20, 22, 26 of the engine 2, typically the high-pressure spool 222, 262, 282, the corresponding converter 421, 422, 423, 424 can be in forced mode, while the other converter 421, 422, 423, 424 is in wait mode.

Table 1 below summarizes the different aspects of the control method E, E', E".

|  | Generation by the HP and LP spools (FIG. 6) | Assistance of the HP spool (FIG. 7) | Assistance of the LP spool (FIG. 8) |
| --- | --- | --- | --- |
| AC bus voltage regulation | First electric generator 401 | First electric generator 401 | First electric generator 401 |
| DC bus voltage regulation | Second converter 422 (free mode) | Second converter 422 (free mode) | First converter 421 (free mode) |
| AC bus power regulation | First converter 421 (forced mode) | First converter 421 (forced mode) | — |
| DC bus power regulation | — | — | Second converter 422 (forced mode) |

Figure 9:
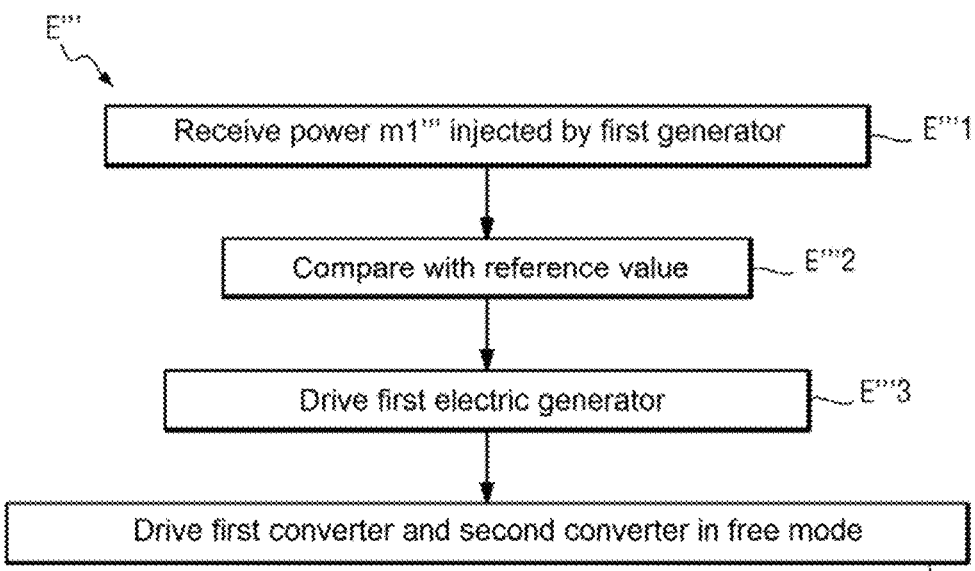
FIG. 9 is a flow chart illustrating an aspect of a second variant of a method of control according to this disclosure.

In a second variant illustrated in FIG. 9, the electrical system 4 is also used E''' to assist the rotary spool 20, 22, 26 (preferably the HP spool) connected to the first electric generator 401, but this time using the ability of the first electric generator 401 to receive an order from the controller 45 to regulate the power of the first bus 411_AC. Here again, a measurement m1''' of an electrical power injected by the first electric generator 401 into the first bus 411_AC is received E'''1, this time by the first electric generator 401, which compares E'''2 this measurement m1''' with a reference value, which is typically the power required to assist the rotary spool 20, 22, 26 (preferably HP spool) to which the first electric generator 401 is connected and which the controller 45 will have transmitted thereto. And, if the measurement m1''' is different from the reference value, it is indeed the first electric generator 401, and no longer the first converter 421 as in the first variant of the control method E, E', E", which is driven E'''3 so as to regulate the power of the first bus 411_AC, i.e. to inject/draw a set electrical power into/off the first bus 411_AC. Moreover, each of the first converter 421 and the second converter 422 is then driven E'''4 so as to operate in a free mode, allowing them to provide the regulation of the voltage, respectively, of the first bus 411_AC and of the second bus 412_DC.

Advantages Obtained

The electrical system and the control method described make it possible to generate, distribute and control a mixed power which can be used to supply electrical loads of the aircraft and/or engine operating both on AC and on DC, while taking into account the limitations on the engine, both when it generates power or when it has to be assisted.

Hence, owing to the presence and driving of the converters, the engines/electric generators of the electrical system are not used solely to supply these electrical loads. Specifically, they also make it possible to optimize the operation of the engine, whether it be at start-up or in an assistance phase, according to the limitations specific to it, particularly in terms of power distribution between the rotary spools. Furthermore, the converters make it possible to regulate the voltage of the DC bus, which guarantees the stability and improves the safety of the electrical system in operation.

Moreover, owing to the electrical system and to the control method described, it is not necessary to make provision for converters and/or electric generators that would be dedicated to the electrical loads running on AC, or to the electrical loads running on DC, which makes it possible to reduce the mass of the engine. Furthermore, even with the addition of electrical loads operating on DC to the usual AC networks, it is possible to keep these usual AC networks, which have the advantage of being of mature technology, without having to add dedicated conversion components to power them from DC networks. Finally, this ensures a dissimilarity at aircraft level between AC networks and DC networks, which the aircraft manufacturer can use to its advantage.

Thus, the electrical system according to one of the embodiments described can be adapted to any type of demand from the DC network and/or from the AC network, which makes it possible to meet the trend for increased electrification of aircraft.

The invention claimed is:
1. A method of control of an electrical system comprising:
a first bus configured to be connected to an AC network of an aircraft to allow transfer of electrical power from the first bus to the AC network;
a second bus configured to be connected to a DC network of the aircraft to allow transfer of electrical power from the second bus to the DC network;
a first electric generator connected to the first bus to inject electrical power into or draw electrical power off the first bus, the first electric generator being configured to be connected to a first rotary spool of an engine of the aircraft to allow an exchange of mechanical and/or electrical power between the first rotary spool and the first electric generator;
a first AC-to-DC converter, the first converter being connected to the first bus to inject electrical power into or draw electrical power off the first bus and to the second bus to inject electrical power into or draw electrical power off the second bus;
a second electric generator configured to be connected to a second rotary spool of the engine of the aircraft to allow an exchange of mechanical and/or electrical power between the second rotary spool and the second electric generator; and
a second AC-to-DC converter, the second converter being connected to the second electric generator to allow an exchange of electrical power between the second electric generator and the second converter, and to the second bus to inject electrical power into or draw electrical power off the second bus;
wherein at least one of the converters is configured to operate according to at least one of the following operating modes:
a forced mode, in which the at least one of the converters provides regulation of the electrical power of at least one bus to which the at least one of the converters is connected; and
a free mode, in which the at least one of the converters provides regulation of a voltage of the second bus, and
wherein the electrical system further comprises a controller configured to drive at least one of the converters so as to an operating mode of the at least one of the converters,
the method being implemented by the controller and comprising:
driving of the second converter so that the second converter operates in free mode to provide the regulation of the voltage of the second bus;
receiving of a first measurement of an electrical power injected by the first electric generator into the first bus;
receiving of a second measurement of an electrical power exchanged between the second electric generator and the second converter;
comparison of a ratio of the first measurement to the second measurement with a reference value; and
driving of the first converter so that, if the ratio is different from the reference value, the first converter operates in a forced mode in which the first converter regulates the electrical power of the first bus.

2. The method of control of an electrical system comprising:
a first bus configured to be connected to an AC network of an aircraft to allow transfer of electrical power from the first bus to the AC network;
a second bus configured to be connected to a DC network of the aircraft to allow transfer of electrical power from the second bus to the DC network;
a first electric generator connected to the first bus to inject electrical power into or draw electrical power off the first bus, the first electric generator being configured to be connected to a first rotary spool of an engine of the aircraft to allow an exchange of mechanical and/or electrical power between the first rotary spool and the first electric generator;
a first AC-to-DC converter, the first converter being connected to the first bus to inject electrical power into or draw electrical power off the first bus and to the second bus to inject electrical power into or draw electrical power off the second bus;
a second electric generator configured to be connected to a second rotary spool of the engine of the aircraft to allow an exchange of mechanical and/or electrical power between the second rotary spool and the second electric generator; and
a second AC-to-DC converter, the second converter being connected to the second electric generator to allow an exchange of electrical power between the second electric generator and the second converter, and to the second bus to inject electrical power into or draw electrical power off the second bus;
wherein at least one of the converters is configured to operate according to at least one of the following operating modes:
a forced mode, in which the at least one of the converters provides regulation of the electrical power of at least one bus to which the at least one of the converters is connected; and
a free mode, in which the at least one of the converters provides regulation of a voltage of the second bus, and
wherein the electrical system further comprises a controller configured to drive at least one of the converters so as to an operating mode of the at least one of the converters,
the method being implemented by the controller and comprising:
receiving of a measurement of an electrical power injected by the first electric generator into the first bus;
comparison of the measurement with a reference value;
driving of the first converter so that, if the measurement is different from the reference value, the first converter operates in a forced mode in which the first converter regulates the electrical power of the first bus; and
driving of the second converter so that the second converter operates in free mode to provide the regulation of the voltage of the second bus.

3. The method of control of an electrical system comprising:
- a first bus configured to be connected to an AC network of an aircraft to allow transfer of electrical power from the first bus to the AC network;
- a second bus configured to be connected to a DC network of the aircraft to allow transfer of electrical power from the second bus to the DC network;
- a first electric generator connected to the first bus to inject electrical power into or draw electrical power off the first bus, the first electric generator being configured to be connected to a first rotary spool of an engine of the aircraft to allow an exchange of mechanical and/or electrical power between the first rotary spool and the first electric generator;
- a first AC-to-DC converter, the first converter being connected to the first bus to inject electrical power into or draw electrical power off the first bus and to the second bus to inject electrical power into or draw electrical power off the second bus;
- a second electric generator configured to be connected to a second rotary spool of the engine of the aircraft to allow an exchange of mechanical and/or electrical power between the second rotary spool and the second electric generator; and
- a second AC-to-DC converter, the second converter being connected to the second electric generator to allow an exchange of electrical power between the second electric generator and the second converter, and to the second bus to inject electrical power into or draw electrical power off the second bus;
- wherein at least one of the converters is configured to operate according to at least one of the following operating modes:
  - a forced mode, in which the at least one of the converters provides regulation of the electrical power of at least one bus to which the at least one of the converters is connected; and
  - a free mode, in which the at least one of the converters provides regulation of a voltage of the second bus, and
- wherein the electrical system further comprises a controller configured to drive at least one of the converters so as to determine an operating mode of the at least one of the converters,
- the method being implemented by the controller and comprising:
  - receiving of a measurement of an electrical power exchanged between the second electric generator and the second converter;
  - comparison of the measurement with a reference value; and
  - driving of the second converter so that, if the measurement is different from the reference value, the second converter operates in a forced mode in which the second converter regulates the electrical power of the second bus; and
  - driving of the first converter so that the first converter operates in free mode to provide the regulation of the voltage of the second bus.

4. The method of control as claimed in claim 2, further comprising driving the first electric generator so that the first electric generator regulates the voltage of the first bus.

5. A computer program comprising instructions which, when the computer program is executed by a computer of the controller, causes the computer to implement the method of control as claimed in claim 1.

6. A non-transitory computer-readable medium comprising instructions which, when executed by a computer of the controller, cause the computer to implement the method of control as claimed in claim 1.

7. The method of control as claimed in claim 3, further comprising driving the first electric generator so that the first electric generator regulates the voltage of the first bus.

8. A computer program comprising instructions which, when the computer program is executed by a computer of the controller, cause the computer to implement the method of control as claimed in claim 2.

9. A non-transitory computer-readable medium comprising instructions which, when executed by a computer of the controller, cause the computer to implement the method of control as claimed in claim 2.

10. A computer program comprising instructions which, when the computer program is executed by a computer of the controller, cause the computer to implement the method of control as claimed in claim 3.

11. A non-transitory computer-readable medium comprising instructions which, when executed by a computer of the controller, cause the computer to implement the method of control as claimed in claim 3.

* * * * *